(12) United States Patent
Schaefer et al.

(10) Patent No.: US 11,285,410 B2
(45) Date of Patent: Mar. 29, 2022

(54) FILTER SKID WITH TILTING MECHANISM

(71) Applicant: Sartorius Stedim Biotech GmbH, Goettingen (DE)

(72) Inventors: Jan Schaefer, Edermuende (DE); Ganeshkumar Padmanabhan, Kassel (DE); Michael Huth, Hasbergen (DE); Ralf Korzuschek, Kassel (DE); Rolf Matthiesen, Goettingen (DE)

(73) Assignee: Sartorius Stedim Biotech GmbH, Goettingen (DE)

( * ) Notice: Subject to any disclaimer, the term of this patent is extended or adjusted under 35 U.S.C. 154(b) by 326 days.

(21) Appl. No.: 16/135,066

(22) Filed: Sep. 19, 2018

(65) Prior Publication Data

US 2019/0083910 A1 Mar. 21, 2019

(30) Foreign Application Priority Data

Sep. 19, 2017 (EP) .................................... 17001566

(51) Int. Cl.
*B01D 29/96* (2006.01)
*B01D 29/56* (2006.01)
(Continued)

(52) U.S. Cl.
CPC .......... *B01D 29/965* (2013.01); *B01D 29/50* (2013.01); *B01D 29/52* (2013.01); *B01D 29/56* (2013.01);
(Continued)

(58) Field of Classification Search
None
See application file for complete search history.

(56) References Cited

U.S. PATENT DOCUMENTS

| 719,438 | A | * | 2/1903 | Crossman | ............ | B01D 25/172 |
| | | | | | | 210/230 |
| 1,120,629 | A | * | 12/1914 | Salisbury | ............... | B01D 35/30 |
| | | | | | | 210/232 |

(Continued)

FOREIGN PATENT DOCUMENTS

| CN | 102065972 | 5/2011 |
| CN | 102065972 | 9/2013 |

(Continued)

OTHER PUBLICATIONS

Korean Office Action dated Feb. 18, 2020.
Chinese Office Action dated Aug. 12, 2020.

*Primary Examiner* — Robert J Popovics
(74) *Attorney, Agent, or Firm* — Gerald E. Hespos; Michael J. Porco; Matthew T. Hespos (57) ABSTRACT

A filtration system (1) has a filtration unit (2) with at least one filter element (4) for filtration of a fluid. The at least one filter element (4) has a main flow direction (C) for the fluid. The filtration unit (2) is configured to tilt the at least one filter element (4) around a tilting axis (B) to change an orientation of the main flow direction (C). A main unit (3) is fluidly connectable to the filtration unit (2) and includes a supply unit (18) configured to supply the fluid to the at least one filter element (4). A control unit is configured to control supplying and/or evacuating the fluid to/from the at least one filter element (4) and to control tilting of the at least one filter element (4) around the tilting axis (B).

10 Claims, 8 Drawing Sheets

(51) Int. Cl.
   *B01D 63/04*   (2006.01)
   *B01D 29/52*   (2006.01)
   *B01D 29/50*   (2006.01)
   *B01D 35/157*  (2006.01)

(52) U.S. Cl.
   CPC ....... *B01D 35/1573* (2013.01); *B01D 63/046* (2013.01); *B01D 2313/06* (2013.01); *B01D 2313/48* (2013.01)

(56) References Cited

U.S. PATENT DOCUMENTS

| | | | | |
|---|---|---|---|---|
| 1,898,604 | A * | 2/1933 | Twiss | B29B 13/06 159/49 |
| 2,496,370 | A * | 2/1950 | Baily | B01D 29/965 210/399 |
| 2,552,360 | A * | 5/1951 | Zichis | F26B 5/06 241/23 |
| 2,605,903 | A * | 8/1952 | Schuller | B01D 29/52 210/331 |
| 3,403,640 | A * | 10/1968 | Schroder | A21C 5/08 366/100 |
| 3,441,141 | A * | 4/1969 | Eicher | B01D 29/70 210/241 |
| 3,494,467 | A * | 2/1970 | Paisley | B01D 35/20 210/241 |
| 3,980,560 | A * | 9/1976 | Eades | B01D 29/05 210/141 |
| 4,172,791 | A * | 10/1979 | Davister | B01D 36/001 210/188 |
| 4,340,477 | A * | 7/1982 | Hobson, Jr | B01D 29/15 210/241 |
| 4,376,705 | A * | 3/1983 | Komura | B01D 29/86 210/413 |
| 4,417,980 | A * | 11/1983 | Baur | B01D 29/86 210/91 |
| 4,705,222 | A * | 11/1987 | Shohet | B01F 7/027 241/101.8 |
| 4,888,111 | A * | 12/1989 | Diemer | B01D 35/16 210/178 |
| 5,397,462 | A * | 3/1995 | Higashijima | B01D 35/04 210/136 |
| 6,290,383 | B1 * | 9/2001 | Shohet | B01F 13/06 366/132 |
| 6,601,315 | B2 * | 8/2003 | Stafford | F26B 3/084 34/329 |
| 7,473,375 | B2 * | 1/2009 | Stoerzer | B01D 29/94 210/791 |
| 7,713,411 | B2 * | 5/2010 | Banister | F26B 3/08 210/232 |
| 9,242,193 | B2 | 1/2016 | Bryan et al. | |
| 9,616,365 | B2 | 4/2017 | Korzeb | |
| 9,636,609 | B2 | 5/2017 | Curran et al. | |
| 2004/0050802 | A1* | 3/2004 | Banister | F26B 3/08 210/771 |
| 2008/0067137 | A1* | 3/2008 | Banister | F26B 3/08 210/771 |
| 2008/0105605 | A1 | 5/2008 | Kobayashi | |
| 2008/0173594 | A1* | 7/2008 | Stoerzer | B01D 29/01 210/791 |
| 2013/0319925 | A1 | 12/2013 | Yee et al. | |
| 2019/0083910 | A1* | 3/2019 | Schaefer | B01D 29/52 |

FOREIGN PATENT DOCUMENTS

| | | |
|---|---|---|
| DE | 32 40 102 | 5/1984 |
| EP | 1 671 710 | 6/2006 |
| EP | 2 208 534 | 3/2014 |
| EP | 2 293 859 | 8/2014 |
| GB | 619 973 | 3/1949 |
| JP | 2015-112516 | 6/2015 |
| KR | 10-2007-0112004 | 11/2007 |
| WO | 2013/187947 | 12/2013 |

* cited by examiner

FILTER SKID WITH TILTING MECHANISM

BACKGROUND

Field of the Invention

The present application relates to a filtration system and a corresponding filtration method for filtering of a fluid.

In general, in addition to the filtration process itself, the filtration of a fluid requires pre- and post-processing at a filtration system, such as rinsing or cleaning a filter, leakage test or the like. For example, before starting a filtration process, preparation operations may comprise preparing a filtration system, testing the filtration system and cleaning the filtration system. Preparing the filtration system may include operations like mounting filter elements to the filtrations system. During testing, the filtration system may be pressurised to ensure that the filtration system is leak-proof in order to avoid that the fluid may leak from the filtration system. Upon the successful testing of the filtration system, cleaning of the filtration system is performed with suitable cleaning fluids. When it is ensured that the filtration system is leak-proof and cleaned, the actual filtration process may start. After the fluid has been filtered by the filtration system, the filtered liquid is recovered from the filtration system. Afterwards, the filtration system need to be cleaned and drained again.

Filtration systems which allow for their manipulation by a user before and after use of the filtration systems are known from the prior art

Related Art

EP 2 208 534 B1 discloses a filtration cart in which a container is tiltable by 90°. The container can be fixed in an operating/locking position and rotated by 90° in an unlocking position where it is possible to get access to the container. The tilting of the container is accomplished by a U-shaped bracket with locking pins which interact with discs.

WO 2013/187947 A1 discloses a support container for a bioreactor which can be tilted by various angles, including 90°. In one embodiment a locking pin engages with a corresponding hole in a rotatable collar and allows tilting and fixing the container in the tilted position in various angles. The locking can be done manually. There is disclosed an additional embodiment with a motor and a controller for the motor which allows for automatic tilting of the support container.

U.S. Pat. No. 9,242,193 B2 discloses a filter holder which holds several filter discs next to each other in a stacked configuration. The filter holder has a holder arm which can be held in an upright space-saving vertical configuration which allows the venting of the filter discs. The holder arm can be tilted down by 90° in a horizontal position by means of a tilting mechanism which is manually operated by a gear box. In the horizontal configuration an ergonomic loading position is achieved in which an operator can easily check the status of the filter discs or remove and replace the filter discs. The holder arm can be tilted about a horizontal tilt axis to assume different intermediate positions between the horizontal and vertical configurations.

U.S. Pat. No. 9,616,365 B2 is a further variation of the filter holder known from U.S. Pat. No. 9,242,193 B2. U.S. Pat. No. 9,616,365 B2 discloses a filter holder which comprises several filter cradles into which stacks of filter discs can be inserted. The filter cradles are accommodated in a carousel which can be rotated via a rotor about a rotation axis. The carousel as a whole can be tilted from a vertical service position for filtration operation in a horizontal indexing position in which a user can exchange the filter discs or otherwise manipulate the filter discs in an ergonomic fashion at waist height of the user.

DE 32 40 102 A1 discloses a filter housing accommodating several flat filter elements wherein the filter housing is rotatable around two pins which are each carried by a separate bearing. By means of the two pins which are driven by a drive unit the filter housing can be tilted from a vertical position to a horizontal position in which solid residues can be removed from the filter elements.

EP 1 671 710 B1 discloses a suction and filtration device with a filter housing which can be tilted about a hinge axis from the vertical position into a horizontal position. A safety belt fixes the filter housing in the tilted position wherein the filtered material can be discharged into a bag.

U.S. Pat. No. 9,636,609 B2 discloses a filtration system with a tiltable filtration unit, electronic means for measuring a degree of filtration and for generating a signal when a predetermined degree of filtration has been achieved, filter tilting means for tilting a filter from a first orientation relative to a horizontal plane to a second orientation relative to the horizontal plane. The filter tilting means is operable to tilt the filter in response to the signal from the electronic means. The electronic means may measure a volume or level of fluid in the pre-filtration chamber and/or a volume or level of fluid in the post-filtration chamber of the filtration unit. Alternatively, the electronic means may measure a time elapsed, or a weight or mass of fluid in one or the other of the chambers. The filter tilting means automatically tilts the filter in response to the signal from the electronic means without requiring manual intervention from an operator. The filter is tilted relative to the base or housing of the filter system which remains stationary. The filter tilting means may comprise an electric motor, such as a servo motor, and/or a mechanical motor, an electric field actuator or an electromechanical screw. Multiple resilient means or actuator springs can be used for more effective and controlled tilting.

In view of the above, it is an object of the invention to provide an improved filtration system which allows an easier handling of the filtration process and involved pre- and post-processing operations.

SUMMARY

According to an aspect of the invention, a filtration system comprises:
- a filtration unit comprising at least one filter element for filtration of a fluid, the at least one filter element having a main flow direction for the fluid, and wherein the filtration unit is configured to tilt the at least one filter element around a tilting axis to change an orientation of the main flow direction;
- a main unit fluidly connectable to the filtration unit, the main unit comprising:
  - a supply unit configured to supply the fluid to the at least one filter element; and
  - a control unit configured to control supplying and/or evacuating the fluid to/from the at least one filter element and to control tilting of the at least one filter element around the tilting axis.

The main flow direction of the fluid corresponds to a direction of how the fluid mainly flows through the at least one filter element during a filtration process and/or pre- and post-filtration operations, e.g. testing the filtration system, cleaning the filtration system and draining the filtration system. However, in exceptional cases the fluid may have a flow direction different to the main flow direction. The main flow orientation may be substantially parallel to an imaginary main flow axis of the at least one filter element. Due to the tilting of the at least one filter element, the orientation of the main flow direction and correspondingly the orientation of the main flow axis may change. For example, due to the tilting of the at least one filter element, the orientation of the main flow direction and correspondingly the orientation of the main flow axis may change with respect to a first axis being parallel to a force of gravity and to a horizontal plane being perpendicular to the force of gravity.

Due to the tilting of the at least one filter element and the gravity acting on the fluid, the at least one filter element may be advantageously positioned for carrying out the filtration process and/or pre- and post-filtration operations.

The supply unit may comprise a pump unit configured to pump the fluid to the at least one filter element. The pump unit may be connectable to a fluid supply and configured to pump the fluid from the fluid supply to the at least one filter element. The fluid supply may be part of the supply unit. Alternatively, the fluid supply may be separated from the supply unit. The fluid supply may be connected to the pump with a suitable connection member. The connection member may comprise a pipeline, wherein the pipeline may be provided as a flexible or solid pipeline.

The control unit may be further configured to control supplying and/or evacuating the fluid to/from the at least one filter element and to control tilting of the at least one filter element dependent on the filtration process and/or the pre- and post-filtration operations.

In one embodiment, the filtration unit is fluidly connected to the main unit with a flexible connection. The flexible connection allows a flexible arrangement of the filtration unit with respect to the main unit. For example, it is possible to position the main unit in different angles with respect to the filtration unit in a closed and controlled manner without compromising the sterility of the system.

In certain embodiments, the filtration unit comprises a tilting frame configured to carry the at least one filter element, the tilting frame being tiltable around the tilting axis. The tilting frame may comprise at least one support member configured to carry the at least one filter element. The at least one support member may be rigidly connected with the tilting frame. Thus, when the tilting frame is tilted around the tilting axis, the at least one support member carrying the at least one filter element is tilted simultaneously. Alternatively, the tilting frame may comprise a conduit system and the at least one filter element is connectable to the conduit system. Hence, when the tilting frame is tilted, the conduit system and the at least one filter element connected to the conduit system are tilted. Thus, when tilting the tilting frame the orientation of the main flow direction is changed.

The filtration unit may comprise a main frame configured to support the tilting frame, the tilting frame being configured to be tiltable with respect to the main frame. For example, a bearing may connect the tilting frame to the main frame and the bearing axis of the bearing may correspond to the tilting axis. The bearing may comprise two ball bearings connecting the main frame with the tilting frame, wherein the tilting axis may correspond to an axis connecting the two ball bearings so that the tilting frame is tiltable around the tilting axis. Furthermore, the main frame may have two opposing support elements. The support elements may extend horizontally and parallel to each other so that the support elements may generate a plane which is parallel to the horizontal plane and/or corresponds to the horizontal plane. When tilting the tilting frame around the tilting axis, the orientation of the main flow direction is changed with respect to the horizontal plane. The ball bearings may be provided at the support members so that the ball bearings are arranged opposite to each other. In other words, each of the ball bearings is associated to a different support element. Thus, the tilting frame may be arranged between the ball bearings and/or the support elements. Hence, the tilting frame is stably connected to the main frame and twisting of the tilting frame during tilting of the tilting frame is reduced.

Furthermore, the filtration unit may comprise an actuator configured to tilt the tilting frame around the tilting axis. The actuator may be arranged between the tilting frame and the main frame. The actuator may be an electromechanical, pneumatic or hydraulic actuator. Furthermore, it is possible to provide more than one actuator. For example the filtration unit may comprise at least two actuators. The at least two actuators may be arranged opposite to each other, having the same effective direction. For instance, the at least two actuators may be provided at the outer edges of the tilting frame and the main frame. Since the effective directions of the at least two actuators are the same, the tilting frame can be tilted steadily around the tilting axis.

In certain embodiments, the control unit is configured to tilt the at least one filter element around the tilting axis to change the orientation of the main flow direction between a first orientation and a second orientation. The first orientation may be a horizontal orientation being parallel to the horizontal plane. In other words, the horizontal orientation may be perpendicular to the first axis, the first axis being parallel to the force of gravity. Furthermore, the second orientation may be a vertical orientation which is perpendicular to the horizontal orientation and/or the horizontal plane. In other words, the vertical orientation may be parallel to the first axis being parallel to the force of gravity. Furthermore, the at least one filter element may be tilted so that the orientation of the main flow direction has a certain tilting angle. The tilting angle may be the angle between the horizontal plane and the orientation of the main flow direction. That is, the tilting angle may be 0° when the main flow direction is in the horizontal orientation and parallel to the horizontal plane. Furthermore, the tilting angle may be 90° when the main flow direction is in the vertical orientation and/or when the main flow direction is perpendicular to the horizontal plane. However, the tilting angle may also be greater or smaller than 90°. Consequently, the at least one filter element can be tilted around the tilting axis, thereby changing the orientation of the main flow direction, so that at least one filter element can be arranged in a position being beneficial for the filtration process and/or pre- and post-filtration operations.

The control unit may be configured, for a test phase and/or for a recovery phase and/or for a draining phase, to tilt the at least one filter element around the tilting axis to change the orientation of the main flow direction into the first orientation. By arranging the at least one filter element in such a position, gravity can be used to support said phases.

The control unit further may be configured, for a filtration phase, to tilt the at least one filter element around the tilting axis to change the orientation of the main flow direction into an orientation between the first orientation and the second orientation. By arranging the at least one filter element in such a manner, the tilting angle may be between 0° and 90°. In other words, the orientation of the main flow direction may be between the horizontal orientation and the vertical orientation. By positioning the at least one filter element during the filtration phase in such a manner, it is possible to increase the effective filter area of the at least one filter element. Thus, the filtration process can be performed quicker, costs are reduced and less waste is produced.

The control unit may be configured to control an inlet valve and an outlet with, the inlet valve and the outlet valve being associated to the at least one filter element. The control unit may control the inlet valve and the outlet valve in such a manner that the fluid can be supplied and/or evacuated from/to the at least one filter element.

The at least one filter element may comprise a first filter element and a second filter element. The control unit may be configured to supply the fluid to the first filter element and the second filter element successively and/or simultaneously. Furthermore, the control unit may be configured to evacuate the fluid from the first filter element and the second filter element successively and/or in parallel. Thus, the fluid may be supplied and/or evacuated to/from the second filter element after the fluid has been supplied and/or evacuated to/from the first filter element. Alternatively, the steps of supplying and/or evacuating of the fluid to/from the first and the second filter element may be carried out in parallel. Thus, a flexible control is provided for supplying and/or evacuating the fluid to efficiently carry out the filtration process and/or the pre- and post-filtration processes.

According to a further aspect, a filtration method for filtering of a fluid is provided. The method comprises the steps of:

providing at least one filter element, the at least one filter element having a main flow direction for the fluid, and wherein the at least one filter element is tiltable around a tilting axis to change an orientation of the main flow direction;

supplying the fluid to be filtered to the at least one filter element;

tilting the at least one filter element around the tilting axis to change the orientation of the main flow direction; and filtering the fluid to be filtered by the at least one filter element.

By tilting the at least one filter element around the tilting axis, it is possible to change the orientation of the main flow direction of the fluid. For example, the orientation of the main flow direction may be changed between a horizontal orientation and a vertical orientation. The horizontal orientation may be parallel to a horizontal plane, the horizontal plane being perpendicular to the force of gravity. The vertical orientation may be perpendicular to the horizontal plane and can be directed upwards against the force of gravity. The orientation of the main flow direction can be expressed by a tilting angle, wherein the tilting angle corresponds to an angle between the horizontal plane and the orientation of the main flow direction. When the main flow direction is in the horizontal orientation, the tilting angle is 0° and when the main flow direction is in the vertical orientation, the tilting angle is 90°. However, the tilting angle may be greater or smaller than 90°.

During filtering the fluid by the at least one filter element, it is beneficial that the tilting angle is between 0° and 90°. By tilting the at least one filter element in a position so that the main flow orientation is different to the vertical orientation, it is possible to increase the effective filter area of the at least one filter element. Thus, filtering can be performed faster, processing costs can be reduced and less waste is generated. However, as an alternative and depending on the design of the filter element a tilting angle greater than 90° may be advantageous.

In one embodiment, the method further comprises turning the at least one filter element around the tilting axis to change the orientation of the main flow direction and recovering the fluid from the at least one filter element. For example, the at least one filter element may be tilted until the orientation of the main flow direction is in a horizontal orientation. The horizontal orientation may be parallel to the horizontal plane. By arranging the at least one filter element in a position such that the main flow direction has the horizontal orientation, gravity can be used to improve the recovering of the filtered fluid.

In certain embodiments, the method further comprises turning the at least one filter element around the tilting axis to change the orientation of the main flow direction and testing the at least one filter element. For example, a pressure test may be carried out to check for any leaks. To perform the pressure test, the vertical orientation of the main flow direction is beneficial. Thus, before performing a pressure test the at least one filter element may be tilted around the tilting axis until the main flow direction is in the vertical orientation. Furthermore, it may be necessary to perform an integrity test of the at least one filter element. For the integrity test of the at least one filter element it is beneficial when the at least one filter element is tilted in a position so that the main flow direction has the horizontal orientation. By tilting the at least one filter element in this position it is possible to identify defects of the at least one filter element.

The above and other objects, features and advantages of the present invention will become more apparent upon reading of the following detailed description of preferred embodiments and accompanying figures. Other features and advantages of the subject matter described herein will be apparent from the description, the figures and from the claims. It should be understood that even though embodiments are separately described, single features may be combined to additional embodiments.

DETAILED DESCRIPTION

The figures are schematic representations, which are not up to scale and which may comprise parts that are enlarged or downsized for a better understanding. Further, some parts may be omitted for better understanding.

Figure 1:
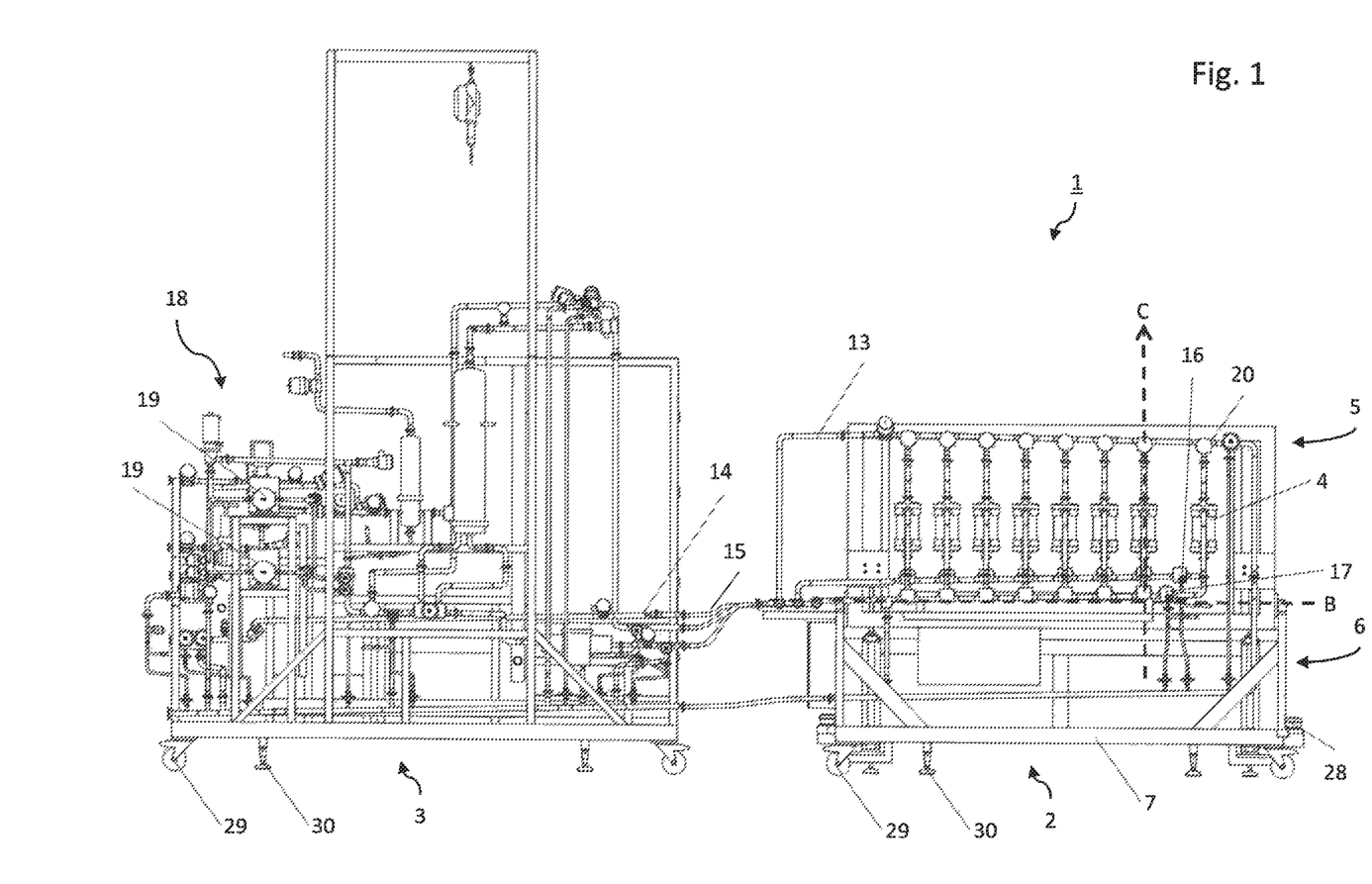
FIG. 1 shows exemplary filtration system.
Figure 2:
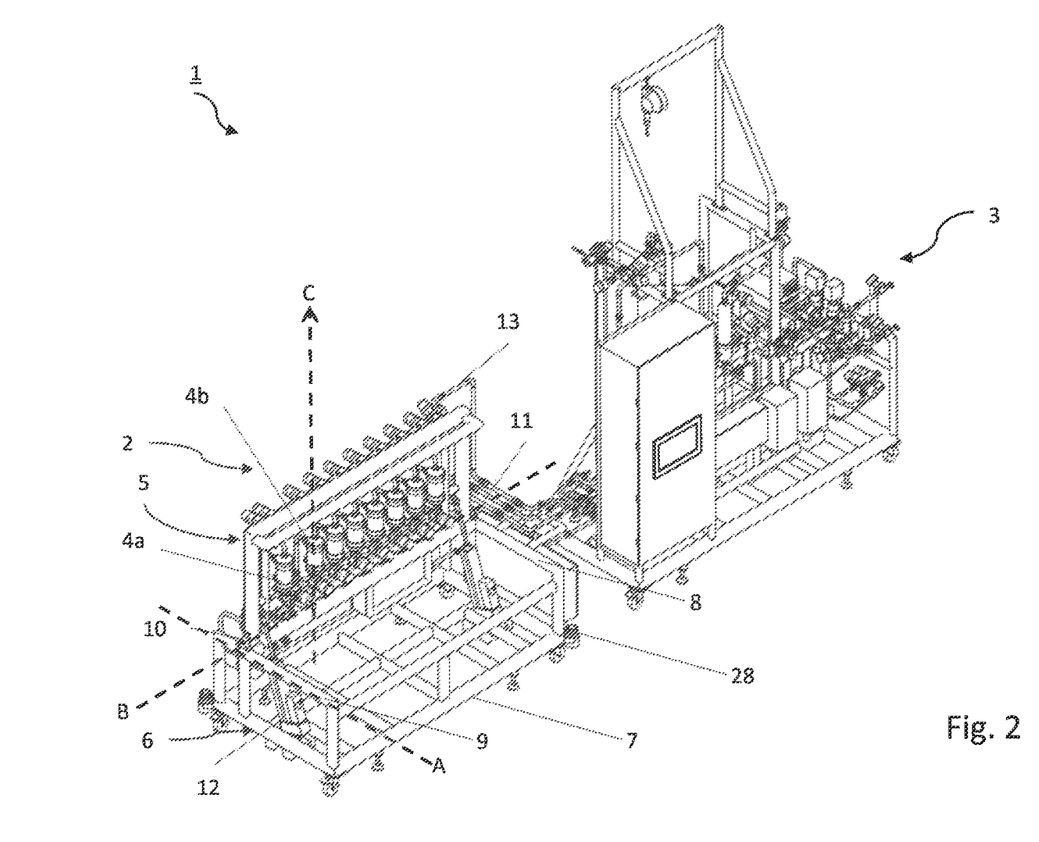
FIG. 2 is a perspective view of an exemplary filtration system in a first disposition.
Figure 3:
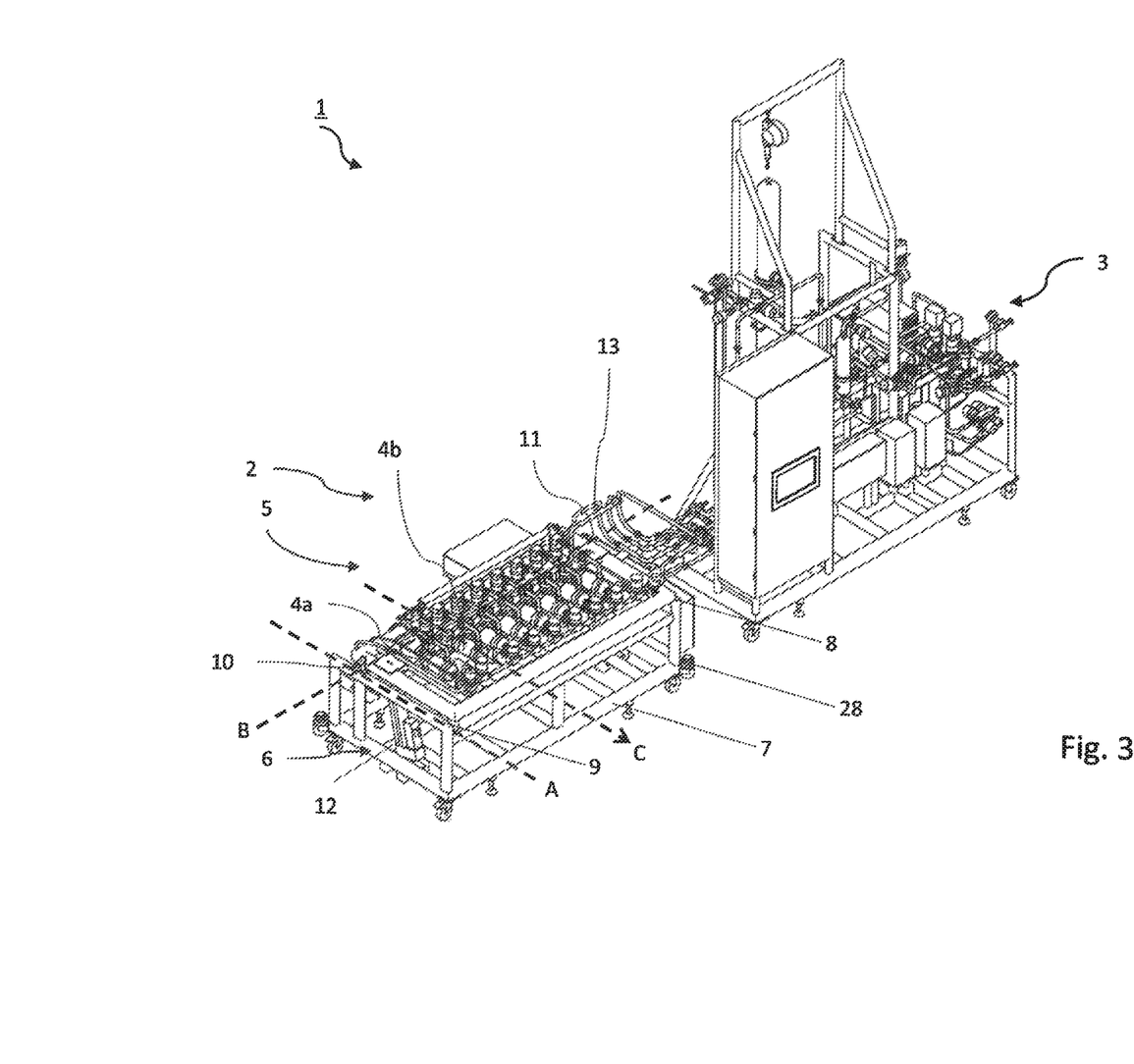
FIG. 3 is a perspective view of an exemplary filtration system in a second disposition.

In the following, a filtration system according to the present disclosure is described with reference to FIGS. 1 to 3. FIGS. 1 to 3 show a filtration system 1. The filtration system 1 comprises a filtration unit 2 and a main unit 3. The filtration unit 2 comprises at least one filter element 4, a tilting frame 5 and a main frame 6. As shown in FIG. 1, the main frame 6 is provided below the tilting frame 5 and the main frame 6 is configured to support the tilting frame 5. The main frame 6 may comprise a frame structure 7 having two support elements 8 and 9 as shown in FIGS. 2 and 3. The two support elements 8 and 9 are arranged parallel to each other and extend horizontally, i.e. perpendicular to the force of gravity, so that the support elements 8 and 9 generate a horizontal plane. For example, the support elements 8 and 9 extend parallel to a horizontal axis A. Each of the support elements 8 and 9 may comprise a bearing 10 and 11 for connecting the tilting frame 5 to the main frame 6. The bearings 10 and 11 may be ball bearings. An axis extending through the bearings 10 and 11 may represent a tilting axis B. The tilting frame 5 may be configured to tilt around the tilting axis B. The at least one filter element 4 is arranged in the tilting frame 5 and may tilt around the tilting axis B when the tilting frame 5 is tilted around the tilting axis B. To tilt the tilting frame 5, the filtration unit 2 comprises at least one actuator 12 connecting the tilting frame 5 and the main frame 6. For example, the at least one actuator 12 may be a hydraulic actuator, pneumatic or an electromechanical actuator.

The at least one filter element 4 may be connected to a conduit arrangement 13 of the tilting frame 5 for supplying the at least one filter element 4 with a fluid. The conduit arrangement 13 may be configured to carry the at least one filter element 4. The conduit arrangement 13 of the tilting frame 5 may be fluidly connected via conduit element 15 to a conduit arrangement 14 of the main unit 3. The conduit element 15 may be provided as a flexible conduit element, so that the main unit 3 and the filtration unit 2 may be positioned flexibly to each other. Preferably, the conduit arrangement 13 may fluidly connect the tilting frame 5 and the main unit 3 in a closed manner thereby maintaining the sterility of the system which is essential for filtration processes of biologicals. For example, the conduit element 15 may be a plastic tube or any other suitable connection. The at least one filter element 4 may be connected to the conduit arrangement 13 of the tilting frame 5 via an inlet valve 16 and an outlet valve 17.

Furthermore, the at least one filter element 4 comprises a main flow direction C of the fluid. The main flow direction C may correspond to a flow direction of the fluid through the at least one filter element 4 when the fluid flows from the inlet valve 16 towards the outlet valve 17. As shown in FIG. 1, the main flow direction C has a vertical orientation being directed opposite to the force of gravity. When tilting the tilting frame 5 around the tilting axis B, the orientation of the main flow direction C is changed. For example, as shown in FIG. 3 the orientation of the main flow direction C is changed to a horizontal orientation, the horizontal orientation may be parallel to the horizontal axis A.

The main unit 3 may further comprise a supply unit 18 for supplying the fluid to the at least one filter element 4. For example, the supply unit 18 may comprise a pump 19 fluidly connected to the conduit arrangement 14 of the main unit 3. The pump 19 may be configured to pump the fluid to the at least one filter element 4 for supplying and/or evacuating the fluid to/from the at least one filter element 4. Furthermore, the main unit 3 may comprise a control unit (not shown) configured to control supplying and/or evacuating the fluid to/from the at least one filter element 4 and to control tilting of the at least one filter element 4 around tilting axis B. In particular, the control unit may be configured to control the inlet valve 16, the outlet valve 17 and the pump 19 in such a manner to supply/evacuate the fluid to/from the at least one filter element 4. Furthermore, the at least one filter element 4 may be connected to a venting valve 20 for venting the at least one filter element 4. The control unit may also be configured to control the venting valve 20.

The main unit 3 and the filtration unit 2 are movable. For example, wheels 29 are provided on the bottom of the main unit 3 and the filtration unit 2 so that the main unit 3 and the filtration unit 2 can be flexibly positioned with respect to each other. Furthermore, the main unit 3 and the filtration unit 2 are configured to be securely positioned on an installation site. For example, securing elements 30 may be provided on the bottom of the main unit 3 and the filtration unit 2 for securing the main unit 3 and the filtration unit 2 at the installation site. For example, the securing elements 30 may comprise height adjustable stands for securing the main unit 3 and the filtration unit 2 at the installation site.

Additionally, the filtration unit 2 may be provided with a motion sensor 28. The motion sensor 28 is configured to detect obstacles within the working area of the filtration unit 2. If it is detected that obstacles are within the working area of the filtration unit 2, tilting of the tilting frame 4 is prevented. Thus, it is possible to prevent that an operator is injured when the tilting frame 4 is tilted around the tilting axis.

Furthermore, the at least one filter element 4 may comprise a first filter element 4a and a second filter element 4b. Each of the first filter element 4a and the second filter element 4b is connected to the conduit arrangement 13 of the filtration unit 2 via a respective inlet valve 16, a respective outlet valve 17 and a respective venting valve 20. Furthermore, the control unit may be configured to supply/evacuate the fluid to/from the first filter element 4a and the second filter element 4b successively and/or in parallel by appropriately operating the respective inlet valve 16, outlet valve 17 and venting valve 20.

Figure 4:
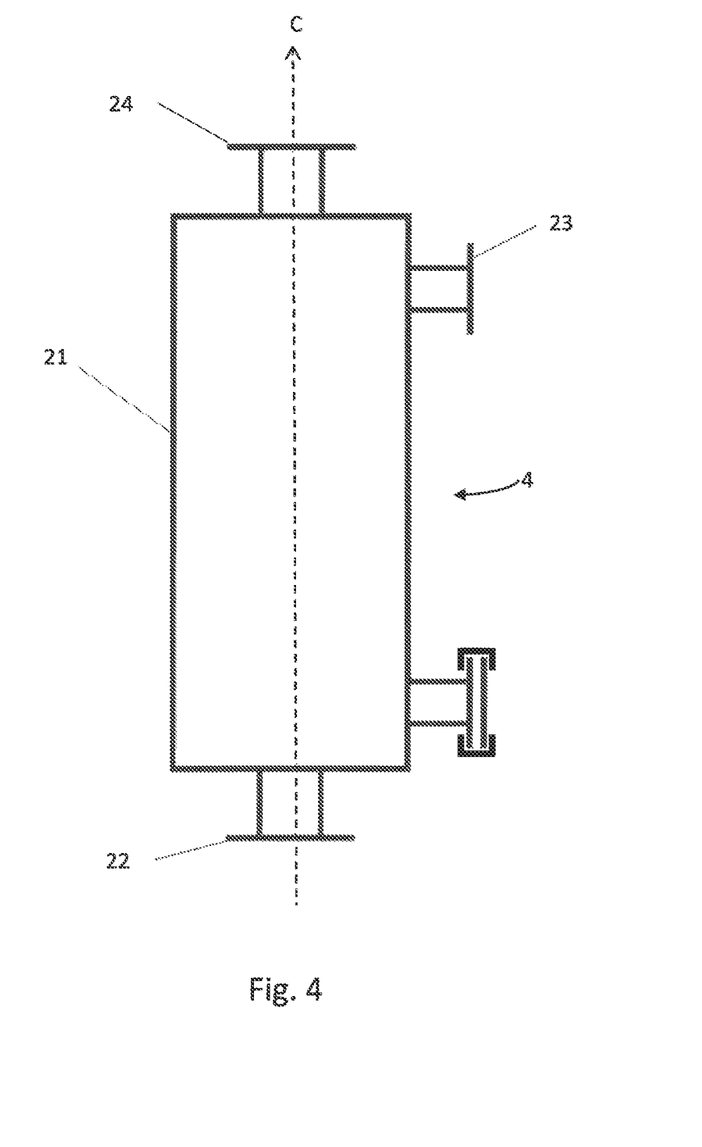
FIG. 4 is a schematic illustration of an exemplary filter element.

FIG. 4 shows an exemplary filter element 4. The filter element 4 may have a cylindrical wall 21. The cylindrical wall 21 extends along the main flow direction C. Furthermore, the filter element 4 may have a first port 22 associated to the inlet valve 16, a second port 23 associated to the outlet valve 17 and a third port 24 associated with the venting valve 20. The fluid may enter the at least on filter element 4 through the first port 22 and the fluid may be taken out of the at least one filter element 4 through second port 23. The main flow direction C may correspond to the flow of the fluid through the filter element 4 when the fluid is flowing from the first port 22 to the second port 23. For example, the filter element may be a hollow fibre filter. However, the disclosure is not limited to hollow fibre filters and any other type of filter medium may be used.

Figure 5:
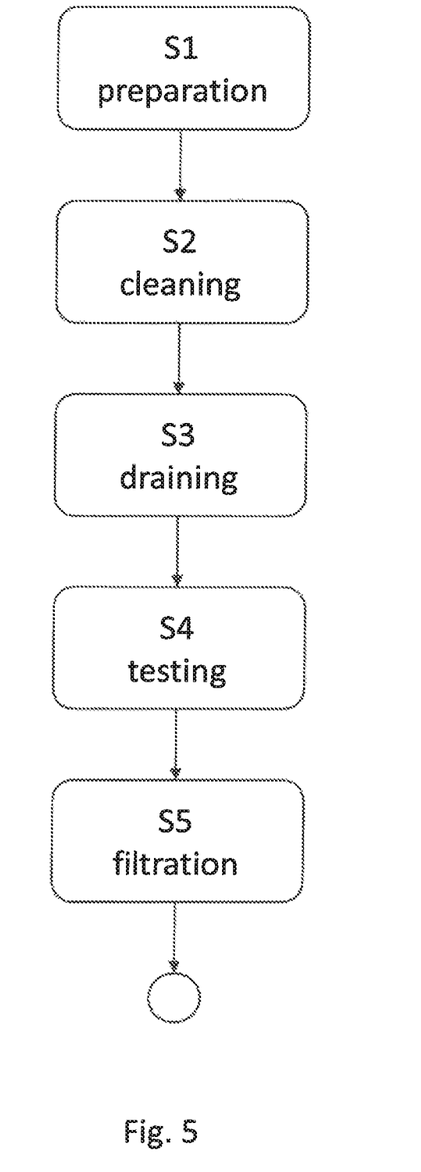
FIG. 5 is a flowchart of an exemplary filtration process.

FIG. 5 shows an exemplary filtration process of a fluid according to the present disclosure. The filtration process will be described with reference to FIGS. 6a to 8b. The exemplary filtration process comprises a preparation step S1, a cleaning step S2, a draining step S3, a testing step S4 and a filtration step S5. However, the filtration process may comprise further steps.

During the preparation step S1, the at least one filter element 4 is inserted into the tilting frame 5 and connected to the conduit arrangement 13 of the filtration unit 2. Furthermore, the main unit 3 is fluidly connected to the filtration unit 2 via the conduit element 15. After the preparation step S1 is finished, the filtration system 1 may undergo a pressure hold test. The pressure hold test is performed to verify that no leaks exist in the filtration system 1, i.e. that the filtration system 1 is leak-proof. During the pressure hold test, the at least one filter element 4 is tilted around the tilting axis B in a position so that the main flow direction C is in a vertical orientation. The vertical orientation is perpendicular to the horizontal plane and is directed opposite to the force of gravity.

When it is verified that the filtration system 1 is leak-proof, the filtration system 1 may be cleaned in cleaning step S2. During the cleaning step S2, the at least one filter element 4 may be tilted around the tilting axis into a position so that the main flow direction C is in the vertical orientation. If the main flow direction C is already in the vertical orientation, the tilting of the at least one filter element 4 is skipped. During the cleaning step S2, a suitable cleaning fluid is supplied to the at least one filter element 4. For example, a cleaning fluid may comprise NaOH or water for injection (WFI).

Figure 6A:
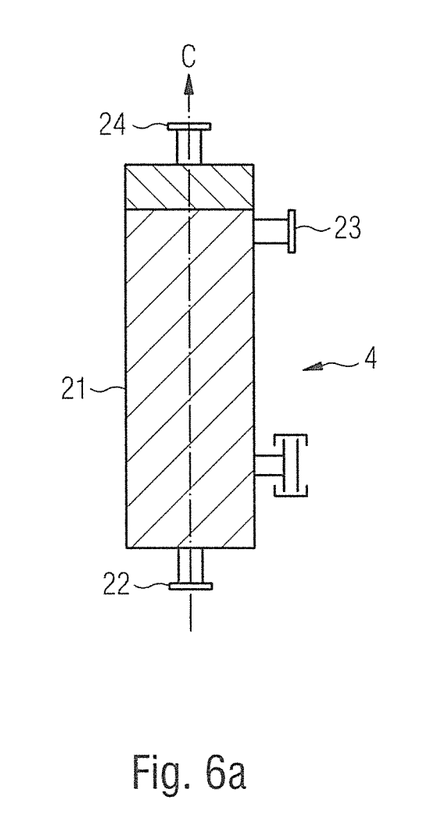
FIGS. 6a and 6b show a first example for using the filtration system.
Figure 6B:
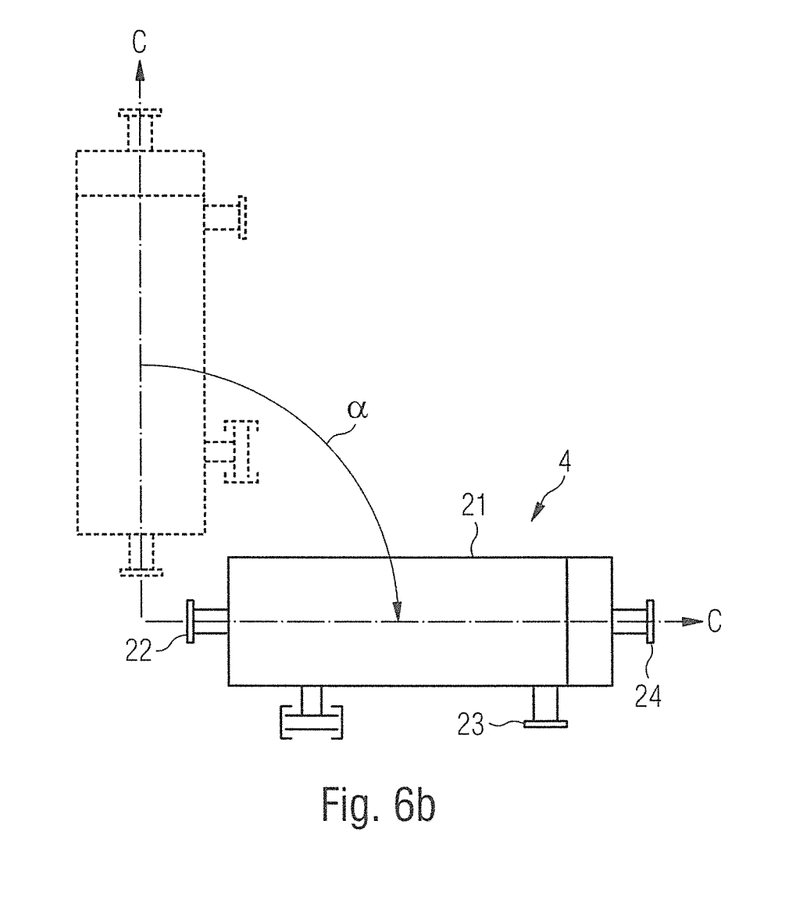

After the cleaning step S2 has been completed, the draining step S3 is carried out. The at least one filter element 4 is tilted around the tilting axis B so that the orientation of the main flow direction C is changed from a vertical orientation (FIG. 6a) into the horizontal orientation (FIG. 6b). By tilting the at least one filter element 4 around the tilting axis B so that the main flow direction C has the horizontal orientation, the cleaning fluid remaining in the at least one filter element 4 can be easier evacuated from the at least one filter element 4. Due to the gravity, the cleaning fluid can be easier evacuated through the second port 23.

Figure 7A:
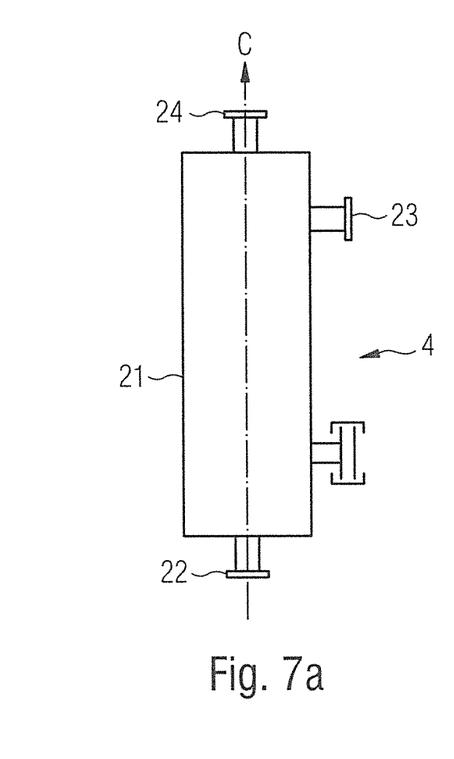
FIGS. 7a and 7b show a second example for using the filtration system.
Figure 7B:
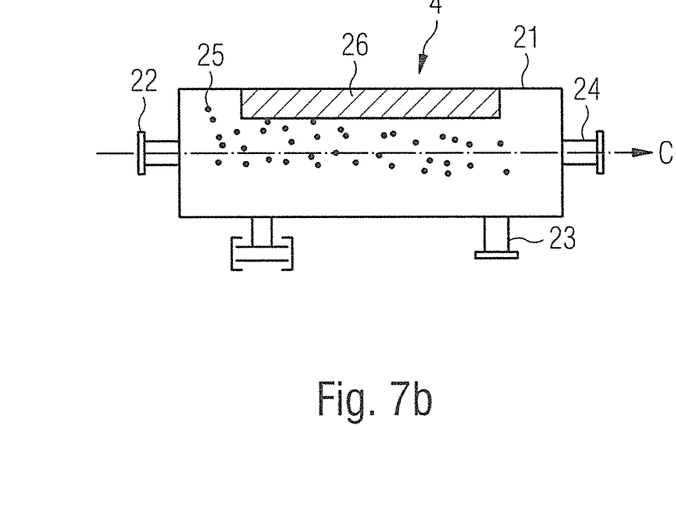

During testing step S4, an integrity test step of the at least one filter element 4 may be performed. For the integrity test step, the at least one filter element 4 may be tilted around the tilting axis B so that the orientation of the main flow direction C changes from a vertical orientation (FIG. 7a) into the horizontal orientation (FIG. 7b). Furthermore, the at least one filter element 4 is filled with a liquid and pressurised air is provided to the at least one filter element 4 via the first port 22. As shown in FIG. 7b, due to the horizontal orientation of the main flow direction C, small gas or air bubbles 25 ascend inside the at least one filter element 4 towards a part of the wall 21 facing up, i.e. away from the installation site. Furthermore, a large gas or air bubble 26 formed by the fusion of multiple small gas or air bubbles 25, which individually may be difficult to observe with the large air bubble 26, ascends inside the at least one filter element 4 towards a part of the wall 21 facing up. This allows a better visual inspection of the at least one filter element 4.

Figure 8A:
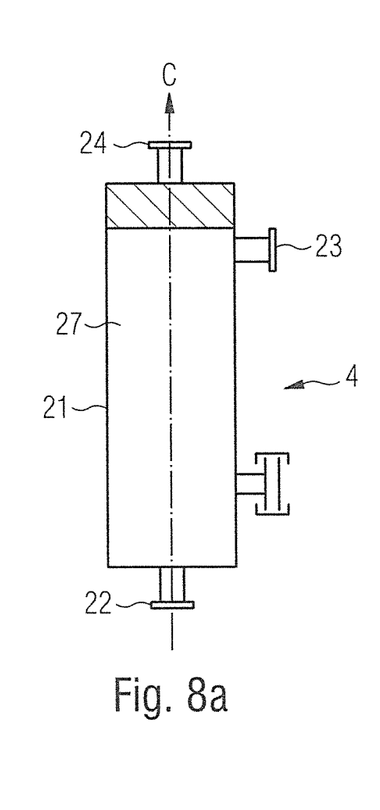
FIGS. 8a and 8b show a third example for using the filtration system.
Figure 8B:
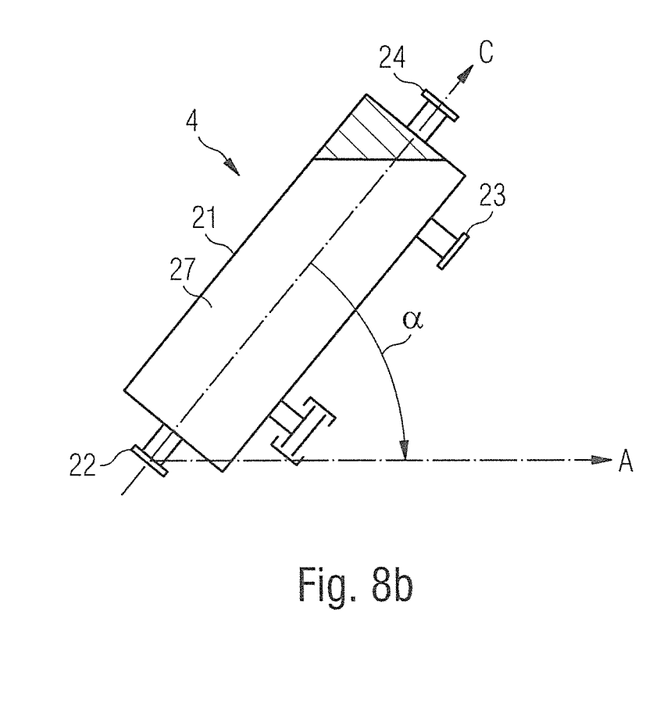

When the filtration system 1 has been drained and tested, a filtration step S5 may be carried out which is explained with reference to FIG. 8a and FIG. 8b. During the filtration step S5, a liquid 27 to be filtered is provided to the at least one filter element 4 via the first port 22 and the at least one filter element 4 is filled with the liquid 27. Furthermore, the liquid 27 can be removed from the at least one filter element number 4 via the second port 23 when the fluid 27 reaches a sufficient level inside the at least one filter element 4. However, in the upper area of the at least one filter element 4 air bubbles 25 may occur causing a reduced effective filter area of the at least one filter element 4. Thus, during the filtration step S5, the at least one filter element 4 is tilted around the tilting axis B into a position so that the main flow direction C is between the horizontal orientation and the vertical orientation. For example, an tilting angle α between the main flow direction and the horizontal axis A may be between 0° and 90°, preferably between 30° and 60° and more preferably 45°. However, depending upon the type and design of the at least one filter element 4, a tilting angle α greater than 90° may be advantageous. When tilting the at least one filter element 4 in such a manner and thereby changing the orientation of the main flow direction, the area for air bubbles 25 inside the at least one filter element number 4 is reduced. Consequently, the effective filter area of the at least one filter element 4 is increased. This leads to a faster filtration processing, reduced cost and less waste.

REFERENCE SIGNS

1 filtration system
2 filtration unit
3 main unit
4 at least one filter element
4a first filter element
4b second filter element
5 tilting frame
6 main frame
7 frame structure
8, 9 support elements
10, 11 bearings
12 actuator
13 conduit arrangement (of the filtration unit)
14 conduit arrangement (of the main unit)
15 conduit element
16 inlet valve
17 outlet valve
18 supply unit
19 pump
20 venting valve
21 wall
22 first port
23 second port
24 third port
25 air bubbles
26 large air bubble
27 liquid
28 motion sensor
29 wheels
30 securing elements
A horizontal axis
B tilting axis
C main flow direction

What is claimed is:
1. A filtration system (1) comprising:
a filtration unit (2) including:
a main frame (6);
a tilting frame (5) movably supported by said main frame and tiltable about a tilting axis (B) between a first position and a second position; and
at least two filter elements (4) mounted on said tilting frame and movable with said tilting frame between said first and second positions; a main unit (3) fluidly connected to the filtration unit (2), the main unit including:
a supply unit (18) fluidically and releasably connected to the at least two filter elements (4), and including means for supplying a fluid to the at least two filter elements (4); and
a control unit configured to control supply and evacuation of said fluid to and from said at least two filter elements (4) and to control tilting of the tilting frame about said tilting axis (B).
2. The filtration system (1) of claim 1, wherein the filtration unit (2) is fluidly connected to the main unit (3) with a flexible conduit (15).
3. The filtration system (1) of claim 1, wherein the control unit is configured to control an inlet valve (16) and an outlet valve (17), the inlet valve (16) and the outlet valve (17) controlling fluid flows to at least one of the at least two filter elements (4).

4. The filtration system (1) of claim 3, wherein the control unit is configured to supply the fluid to the first filter element (4a) and the second filter element (4b) successively and/or simultaneously, and/or wherein the control unit is configured to evacuate the fluid from the first filter element (4a) and the second filter element (4b) successively and/or simultaneously.

5. The filtration system (1) of claim 1, further comprising a tilting actuator (12) that extends between the main frame (6) and the tilting frame (5), the tilting actuator (12) being capable of tilting the at least two filter elements (4) about the tilting axis.

6. The filtration system (1) of claim 1, wherein the supply unit (18) comprises at least one conduit to supply the fluid to the at least two filter elements (4), and wherein the main unit (3) comprises at least one valve in fluid communication with the at least one conduit to control supplying and/or evacuating of the fluid to and/or from the at least two filter elements (4) in conjunction with the tilting of the at least two filter elements (4) around the tilting axis (B).

7. The filtration system (1) of claim 6, wherein the at least one valve comprises an inlet valve (16) and an outlet valve (17), the inlet valve (16) and the outlet valve (17) being capable of controlling flows with respect to the at least two filter elements (4).

8. The filtration system (1) of claim 1, wherein the means for supplying a fluid comprises a pump (19).

9. The filtration system (1) of claim 1, wherein the at least two filter elements (4) comprise hollow fiber filters.

10. The filtration system (1) of claim 1, wherein said first position is a horizontal orientation and said second position is a vertical orientation.

\* \* \* \* \*